April 27, 1954 P. J. HEIDEN ET AL 2,676,368
CASTING MACHINE
Filed Jan. 14, 1950 9 Sheets-Sheet 1

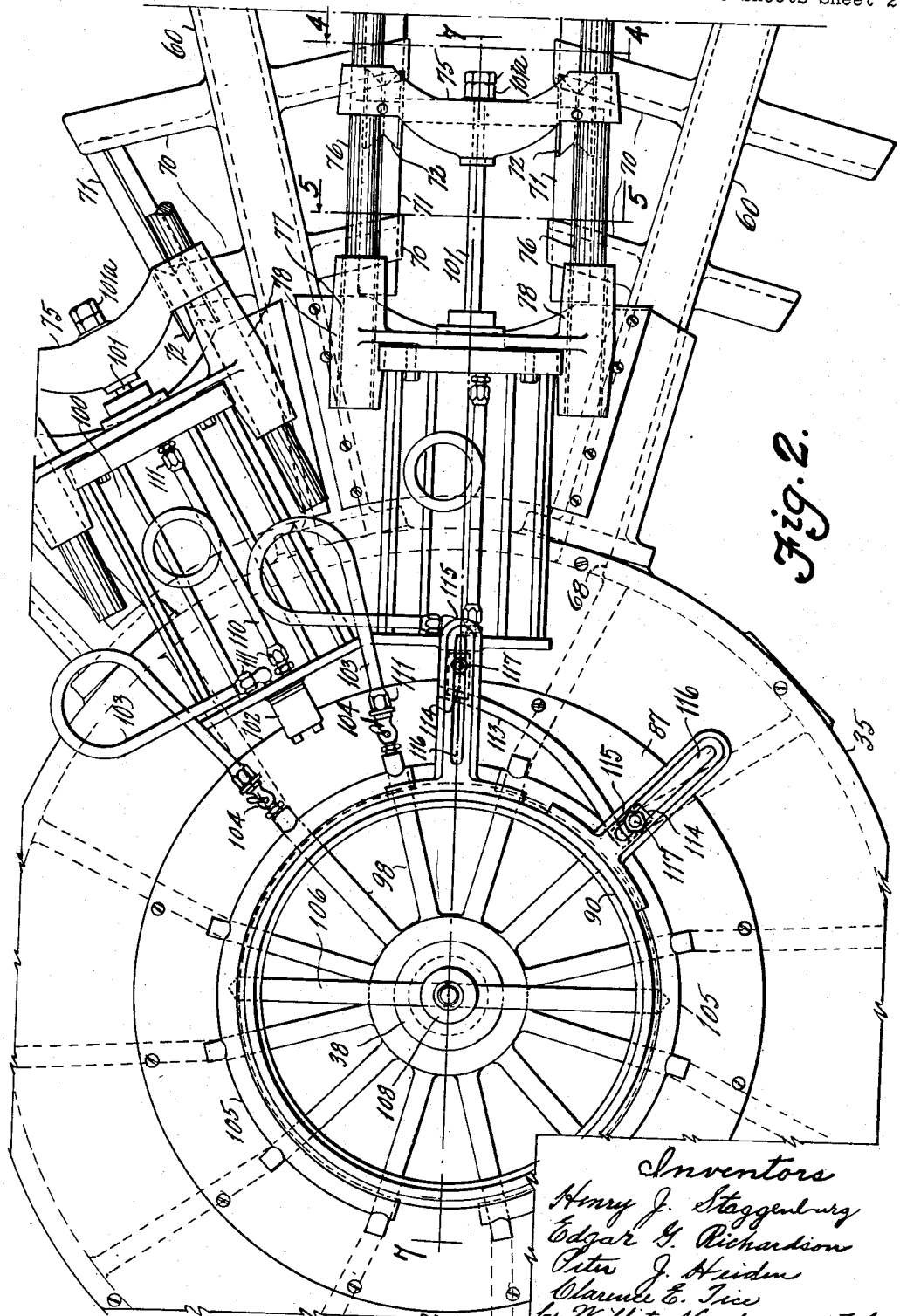

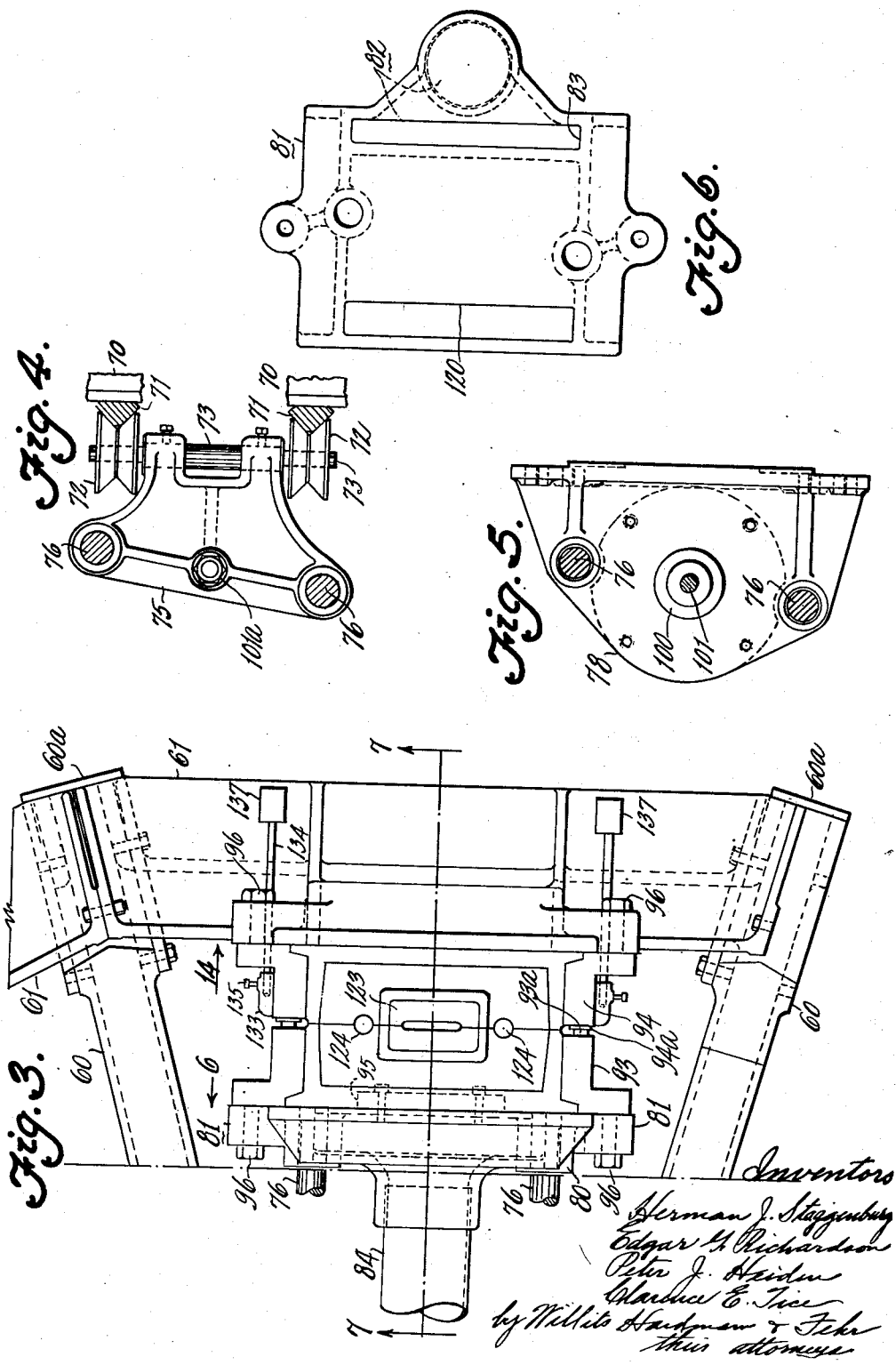

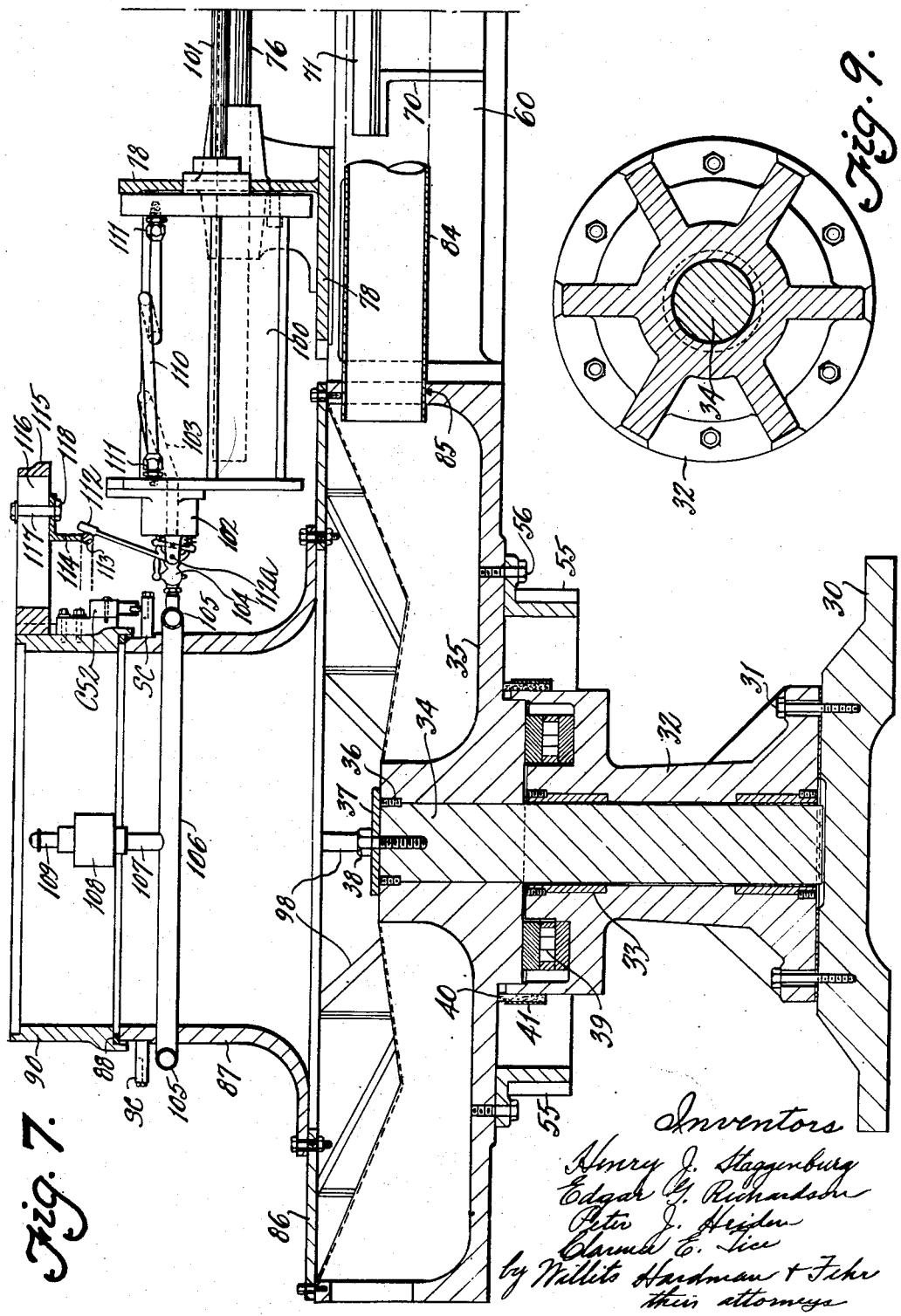

April 27, 1954
P. J. HEIDEN ET AL
2,676,368
CASTING MACHINE
Filed Jan. 14, 1950
9 Sheets-Sheet 5
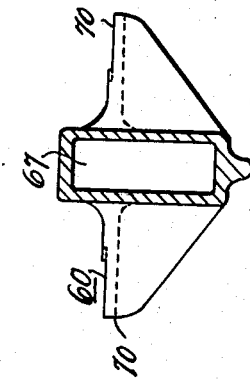
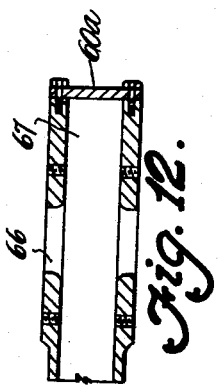
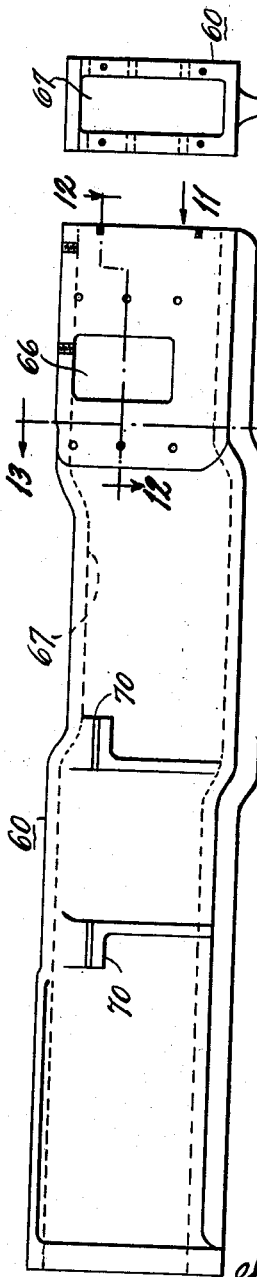
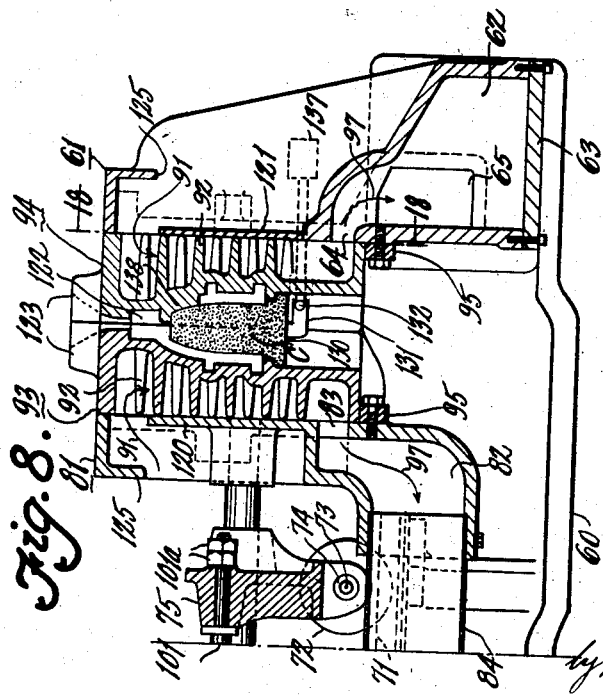

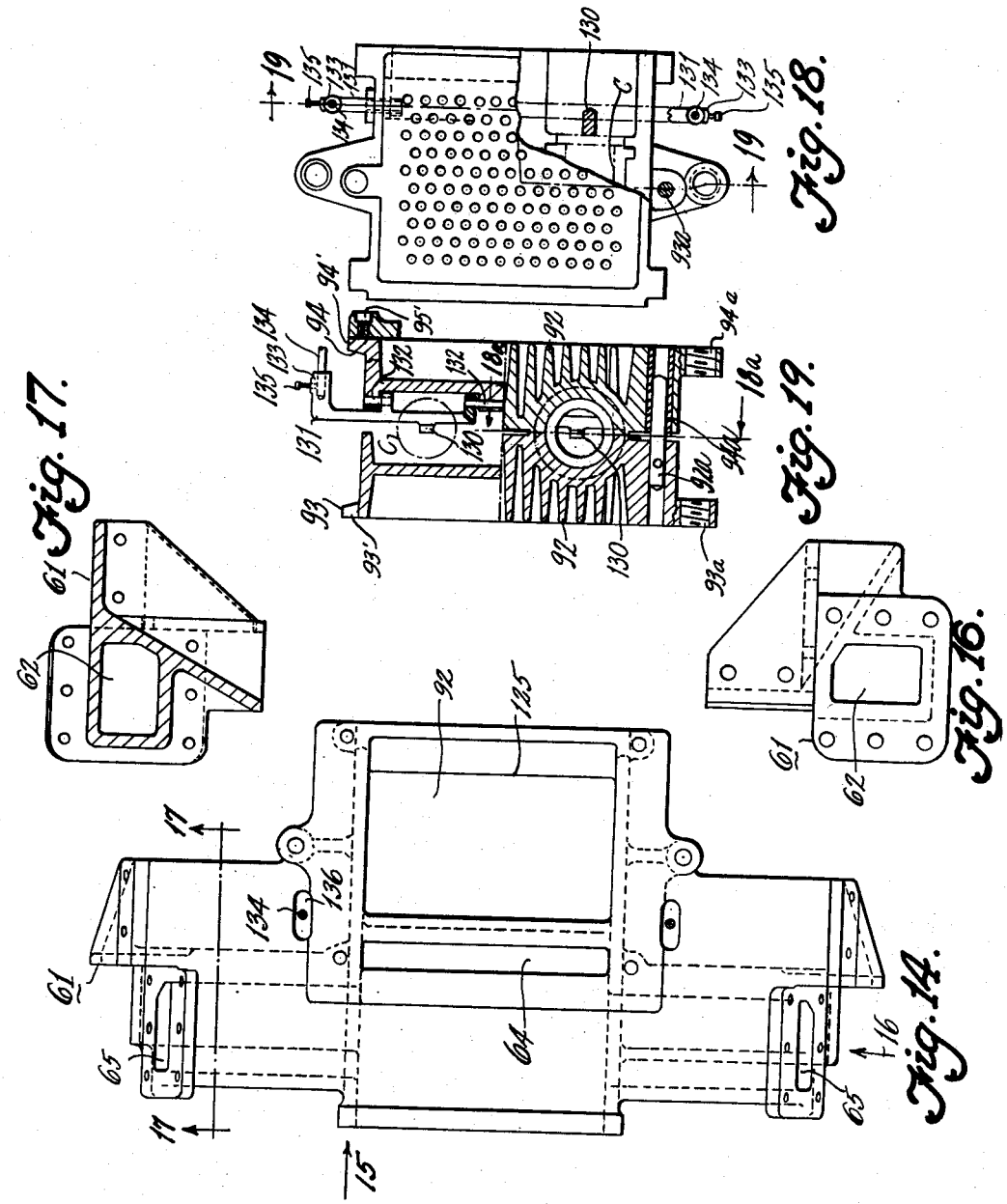

April 27, 1954 P. J. HEIDEN ET AL 2,676,368
CASTING MACHINE
Filed Jan. 14, 1950 9 Sheets-Sheet 7
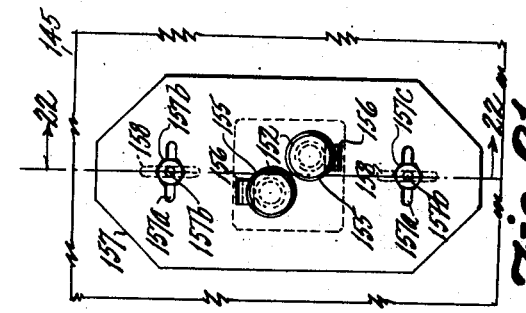
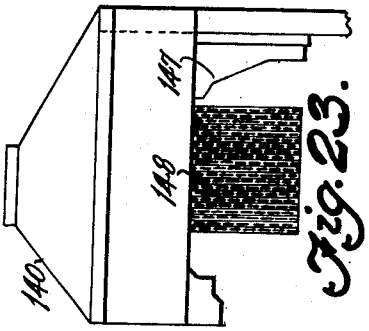
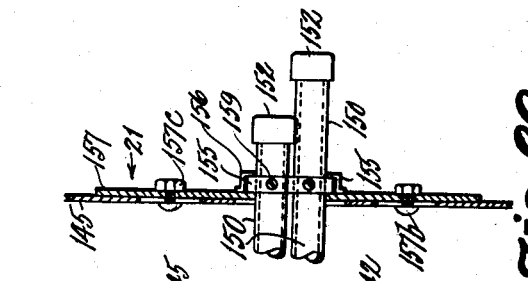
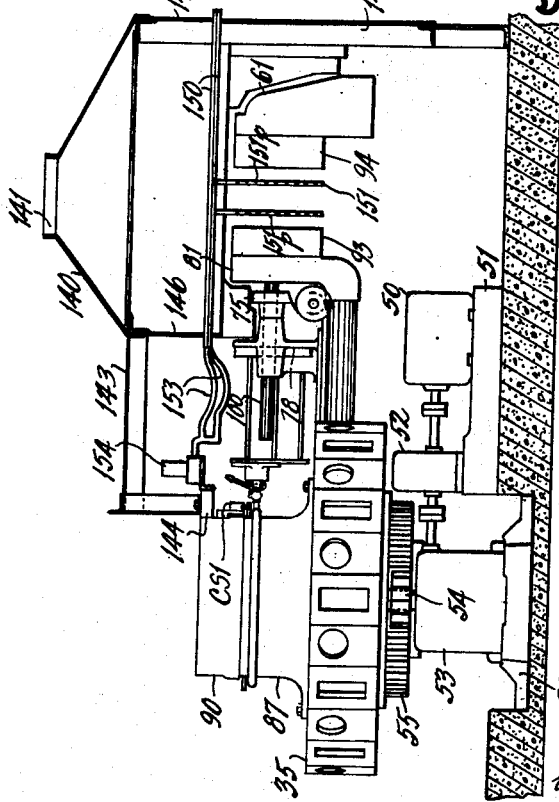
Inventors
Herman J. Staggenburg
Edgar H. Richardson
Peter J. Heiden
Clarence E. Tice
by Willits Hardman & Fehr
their attorneys

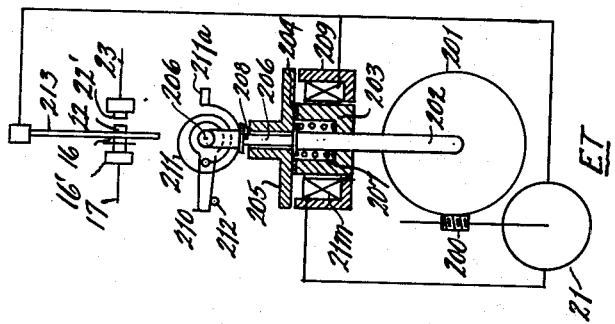
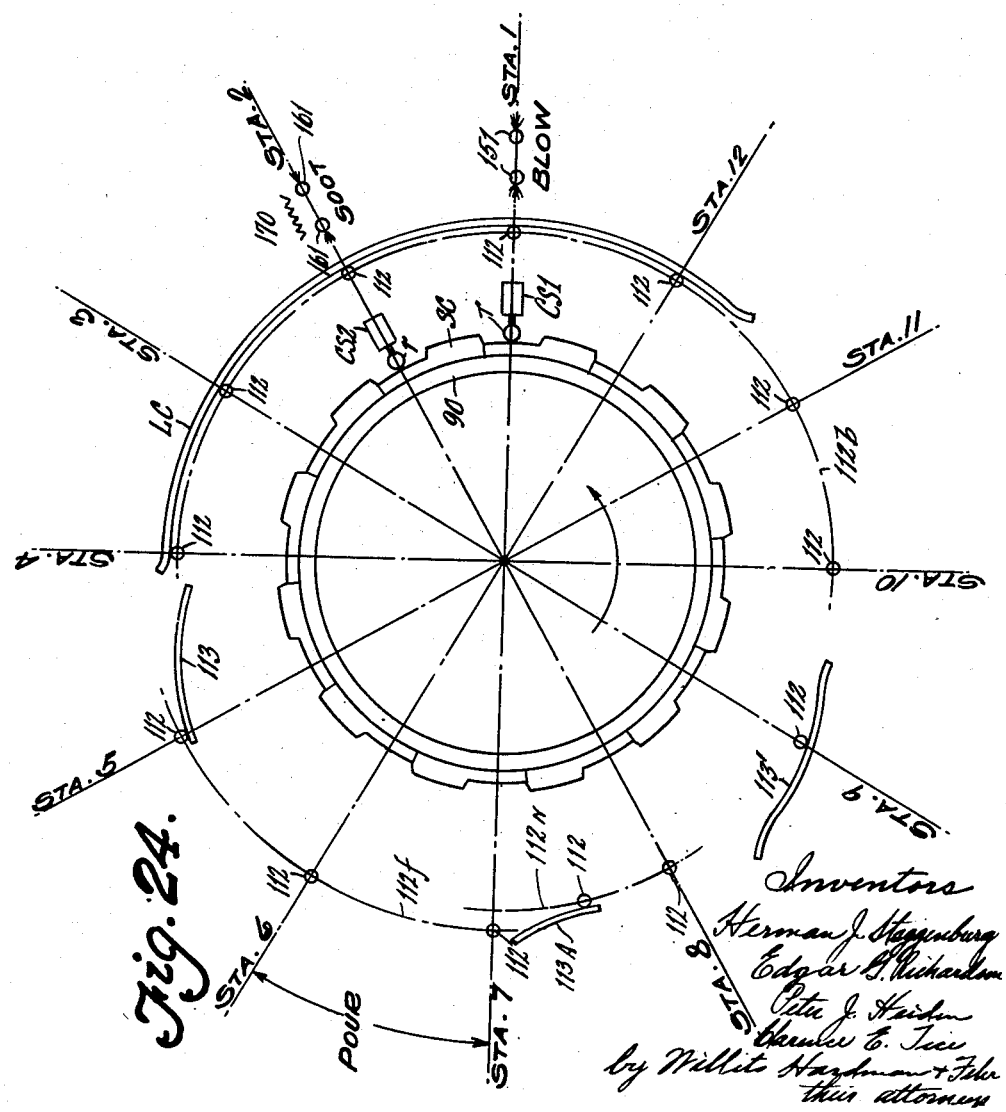

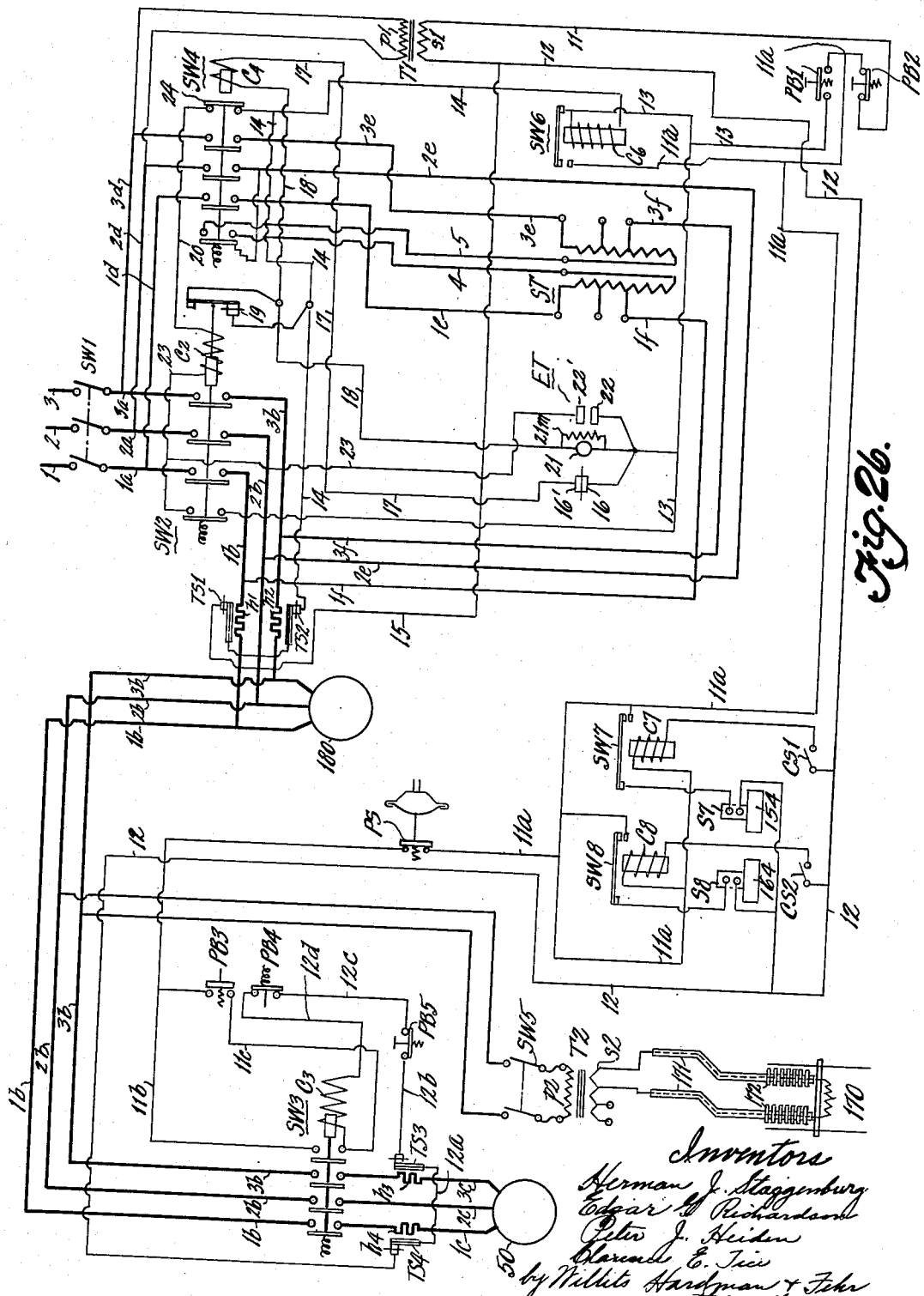

Patented Apr. 27, 1954

2,676,368

UNITED STATES PATENT OFFICE 2,676,368

CASTING MACHINE

Peter J. Heiden, Herman J. Staggenburg, Clarence E. Tice, and Edgar G. Richardson, Anderson, Ind., assignors to General Motors Corporation, Detroit, Mich., a corporation of Delaware Application January 14, 1950, Serial No. 138,595

2 Claims. (Cl. 22—57)

This invention relates to the manufacture of castings of ferrous metal by means of a permanent mold casting machine.

The objects of the invention are to provide certain improvements in the type of permanent mold casting machine shown in the Leo C. Shippy Patent No. 1,925,497.

A still further object of the invention is to provide an electrical interlock in the operating system of the machine whereby a defined sequence of operations must occur, said sequence being as follows: the air is first turned on for the operation of the servomotors, then the blowers for the cooling and ventilating equipment are energized and finally the main driving motor for the machine is brought into operation. In this manner, the machine cannot be operated at any time unless the air pressure for activating the servomotors and the ventilating equipment is in operation. This sequence of operations eliminates burn-outs, loss of metal and other undesirable conditions.

In carrying out the above object, it is another object of the invention to provide an additional electrical interlock connecting the blow-off and sooting devices with the driving means for the machine whereby if the machine is not in operative condition, the blow-off and sooting devices are not operative thereby conserving gas and air.

Another object is to provide reliable means for igniting the gas which is used to supply a soot-coating to the dies.

Another object of the invention is to provide guard means for the ignition device used in connection with the sooting equipment for preventing over-heating of the ignition device during the sooting operation.

Another object of the invention is to provide adjustable means for controlling the valve which dominates the flow of gas to the sooting device whereby the cost of operation may be held to a minimum by proper adjustment so that the gas supply for the sooting device is only permitted to be open for a predetermined period during which the mold is being sooted.

Further objects and advantages of the present invention will be apparent from the following description, reference being had to the accompanying drawings, wherein a preferred embodiment of the present invention is clearly shown.

In the drawings:

Fig. 1 is a plan view of the machine.

Figs. 2 and 3 together comprise a fragment of the plan view drawn to a larger scale than Fig. 1.

Figs. 4 and 5 are sectional views taken respectively on lines 4—4 and 5—5 of Fig. 2.

Fig. 6 is a view in the direction of arrow 6 of Fig. 3 of a movable die supporting frame 81.

Figs. 7 and 8, taken together, constitute a sectional view on the line 7—7 of Figs. 2 and 3.

Fig. 9, on the same sheet with Fig. 7, is a sectional view on line 9—9 of Fig. 7.

Fig. 10, on the same sheet with Fig. 8, is a side view of one of the beams or spokes 60 of the machine.

Fig. 11 is a view in the direction of arrow 11 of Fig. 10.

Figs. 12 and 13 are, respectively, sectional views on lines 12—12 and 13—13 of Fig. 10.

Fig. 14 is a view in the direction of arrow 14 of Fig. 3 of a fixed mold supporting frame 61.

Figs. 15 and 16 are views looking respectively in the direction of arrow 15 of Fig. 14.

Fig. 17 is a sectional view on line 17—17 of Fig. 14.

Figure 1:
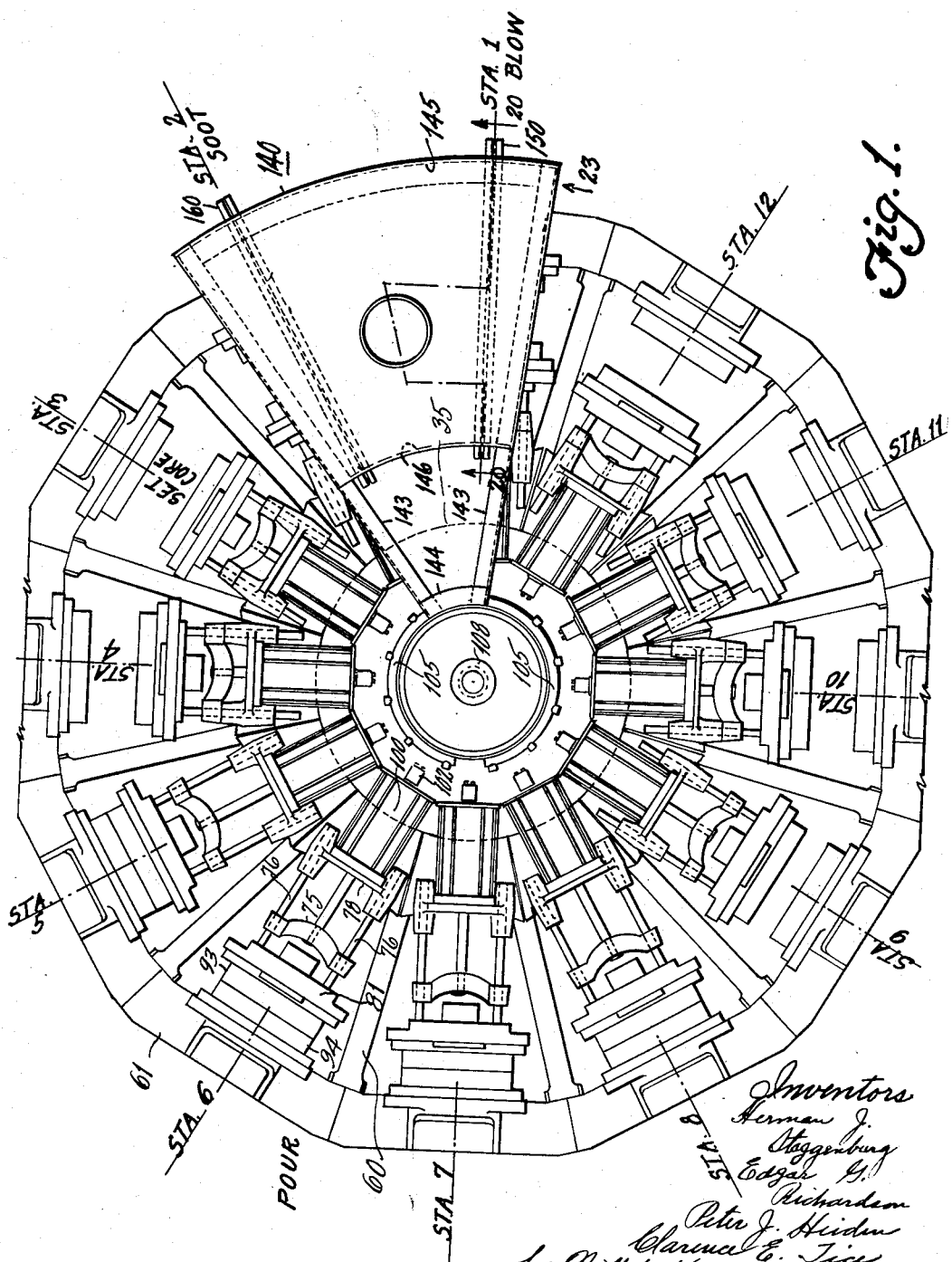

Fig. 18 is a view on the line 18—18 of Fig. 8, showing one of the outer or fixed dies 94. The part in section (Fig. 18) is on the line 18a of Fig. 19.

Fig. 19 is a sectional view of fixed and movable dies taken on the line 19—19 of Fig. 18.

Fig. 20 is a diagram of the machine and means for driving it together with a hood 140 enclosing pipes used for purposes to be described, said hood being in section on line 20—20 of Fig. 1.

Fig. 21 is an enlarged view in the direction of arrow 21 of Fig. 22 showing means for adjustably supporting pipes within the hood.

Fig. 22 is a sectional view on the line 22—22 of Fig. 21.

Fig. 23 is a view in the direction of arrow 23 of Fig. 1, but drawn to a smaller scale; and it shows one of the chain curtains 148 through which the dies move on entering and leaving the hood.

Fig. 24 is a cam diagram.

Fig. 25 is a diagram of an electric timer.

Fig. 26 is a wiring diagram of the controls of the machine which include the timer shown in Fig. 25.

Referring to Figs. 7 and 8, the machine has a base 30 to which screws 31 attach a pedestal 32 providing bearings 33 for a shaft 34 attached to a hub 35 by screws 36 covered by plate 37 attached by screw 38 to shaft 34. The weight of the shaft and the hub and parts supported thereby is transmitted to the pedestal and base by thrust bearing 39 retained by the pedestal. To exclude dust from the bearing 39, the pedestal supports a seal ring 40 retained by a band 41, said ring being engaged by the hub 35 as it rotates.

Referring to Fig. 20, an electric motor 50 mounted on a base 51 drives a fixed ratio speed reducer 52 which drives a variable ratio speed reducer 53 mounted on base 30 and driving a gear 54 meshing with a ring gear 55 which, as shown in Fig. 7, is connected by screws 56 with hub 35.

Beams or spokes 60 (Figs. 2 and 3) which extend radially from the hub 35 and support at their outer ends fixed die supporting frames 61, each providing an air passage 62 (Fig. 8) closed at the bottom by a cover 63 (removable for clean out) and having an inlet 64 and two outlets 65 each connected through an inlet 66 (Fig. 10) with a passage 67 in a beam 60 whose outlet is connected, as shown in Fig. 2, with a hole 68 provided in the side wall of hub 35.

Beams 60 (Fig. 2) have integral shelves 70 which support rails 71 which receive grooved wheels 72 (Fig. 4) supported by a rod 73 through the medium of dust sealed ball bearings 74 (Fig. 8). Rod 73 supports a carriage 75 connected with guide rods 76 slidable in bearings 77 provided by a frame 78 attached to beams 60. Rods 76 are connected with tubular bosses 80 (Fig. 3) of a movable die supporting frame 81 providing an air passage 82 (Fig. 8) having an inlet at 83 and an outlet connected with a pipe 84 attached to frame 81 and extending through a hole 85 (Fig. 7) in the side wall of hub 35. Pipe 84 is supported by hub 35 for sliding movement relative thereto.

Hub 35 supports a ring plate 86 supporting a sleeve 87 which, through the medium of a ring bearing 88, supports a sleeve 90 rotation of which is prevented by means to be described. Sleeve 90 is connected with vertical pipe, not shown, leading to the intake of a suction fan or blower (not shown) driven by a motor 180 (Fig. 26). This blower induces the circulation of air in the general direction represented by arrows 91 (Fig. 8) and downwardly past radiating pins 92 integral with permanent mold members 93 and 94 supported on bars 95 attached to frames 81 and 61 and attached thereto by screws 96 (Fig. 3). As indicated by arrows 97, air flows into the passages 82 and 62 of frames 81 and 61, respectively, and thence through the passages described to the interior of hub 35. Hub 35 is provided with baffles 98 to help equalize the distribution of the suction effect with respect to the molds 93 and 94. So long as the machine is in operation the blower operates to cause the circulation of air for cooling the molds.

Each pair of molds is closed and opened by a compressed air servo-motor including a cylinder 100 (Figs. 2 and 7) supported by a frame 78 and containing a piston connected by rod 101 and nuts 101a with a carriage 75. Each cylinder supports its own control valve 102, the intake of which is connected by a curved pipe 103 (Fig. 2) and a shut-off valve 104 with an arcuate pipe 105 of the compressed air distributing manifold which includes a cross pipe 106 (Fig. 2) which is connected with a centrally located pipe 107 (Fig. 7) connected by a swivel coupling 108 with a fixed pipe 109 which can be connected in any suitable manner with a source of compressed air, not shown. Each valve 102 has one distributing port connected with an inner end of cylinder 100 and another distributing port connected by a bent pipe 110 with the outer end of the cylinder. The pipes 103 and 110 are bent, as shown in Fig. 2, in order to facilitate the making of connections by the use with the couplings 111. The machine, being made with interchangeable parts, it is a relatively simple matter to remove the unit which comprises a frame 78, a cylinder 100, a carriage 105 and a mold frame 81. These units can be individually removed from the machine after the molds 93 and 94 have been removed and after cylinder 100 is disconnected from pipe 103.

Each valve 102 has an operating handle 112 which, as shown in Fig. 7, has been placed in position for causing the valve 102 to admit compressed air to the rear end of cylinder 200 so that the piston therein moves outwardly and causes the mold 93 to be brought into engagement with mold 94. Handle 112 has been moved into this position automatically during a portion of the rotary movement of hub 35 into a counterclockwise direction (Figs. 1 and 2). This is effected by the engagement of handle 112 with a curved cam bar 113 attached at its ends to angles 114 adjustably supported by brackets 115 attached to the fixed sleeve 90. Each bracket 115 has a slot 116 received by a screw 117 passing through an angle 114 and receiving a nut 118 whereby the rod 113 can be clamped in the desired position of adjustment as shown in Fig. 24. A rod 113', supported in the same manner as rod 113, is used for moving the handle 112 counterclockwise (Fig. 7) about its pivot 112a, in order to condition valve 102 for admitting compressed air to the outer end of cylinder 100 in order that movable mold 93 will be retracted from the fixed mold 94.

Each pair of molds including the movable mold 93 and the fixed mold 94 are adjustable with respect to one another so that perfect mating of the faces of the two mold sections may be obtained. This is accomplished by providing pads 93' and 94' on mold parts 93 and 94, respectively. Four of the pads 93' and 94' are provided at the corners of each mold part. The pads 93', which are integral with the movable mold 93, merely abut the die supporting frame 81. The mold 93 is held in place by means of bolts 96 which pass through the frame and into the threaded ears 93a on the movable mold part 93. Adjustments for the alignment of the mold parts 93 and 94 are carried out entirely with respect to the stationary mold 94. This mold includes threaded ears 94a which receive bolts passing through the die supporting frame 61 as noted in Fig. 14 where the frame 61 is shown in some detail. These bolts are drawn up rather loosely and then screws 95', of which four are provided and which also pass through frame 61, are adjusted against the pads 94' to exactly align the mold 94 with the mold 93. This is most easily done by permitting the mold 94 to be loosely hung on the frame 61 and then closing the mold section by causing the movable section 93 to move into tight engagement with the stationary section 94, after which the adjustment screws 95' may all be tightened and finally the bolts passing into the threaded ears 94a may be tightened to set the adjustment for perfect mating of the sections of the two mold parts 93 and 94.

In order to confine the mold cooling air to the vicinity of the radiating pins 92 of the molds, the frame 81 has an integral plate 120 (Fig. 8) extending close to the pins 92; and for the same purpose, plate 121 is attached to the frame 61. The molds when brought together form cavities 122, there being two cavities in the molds shown. The molds, when together, provide a funnel 123 into which molten metal is poured, said funnel having branch passages (not shown) connected with the cavities 122. The molds, when together, provide vents 124 for these cavities. If any metal happens to spill over the side of the funnel 123 it will gravitate from the tops of the molds and from deflectors 125, which are spaced sufficiently from the guard plates 120 and 121 so that it is unlikely that any metal will be picked up by the air and drawn in by the cooling air stream and be deposited upon the radiating pins 92. The molds may be shaped for casting, for example, starter drive housings of electric starting motors for use on automobiles. For this purpose, it is necessary to provide cores. These cores, such as C in Fig. 8, are supported upon lugs 130 of a lever 131 pivoted on rods 132 which, as shown in Fig. 19, are supported by the fixed mold 94. Lever 131 has an arm 133 providing a socket for receiving a rod 134 confined in the socket by screw 135. Each lever 134 extends through a slot 136 (Fig. 14) in frame 61 and supports a counterweight 137, the mass of which is sufficient to urge the core C upwardly against a ledge 138 of the mold 94 as shown in Fig. 8, said ledge being part of the mold which extends over to the core so that the casting will have a hole therein communicating with the hollow interior of the casting. Upon separating the molds after forming a casting, the castings may be ejected from the molds in any suitable manner.

Referring to Fig. 1, there is shown a machine having twelve pairs of permanent molds; the machine can be adapted by suitable arrangement of the valve controlling cams 113, 113' and 113A for the closing and opening of the molds at different times during rotation of the hub by controlling the valve 102 through levers 112. As the hub rotates, it moves a pair of open dies past stations indicated by dot-dash radial lines marked "Sta. 1," etc., reading in a counterclockwise direction. While a pair of molds passes Sta. 1, compressed air is blown upon the mold surfaces to clean them. At station 2, a sooty flame is caused to play on the mold surfaces in order to coat them with soot so that the castings will not adhere to the molds. At station 3, the operator sets the cores by placing them upon the lugs 130 of levers 31, as shown in Fig. 8. The molds are closed at station 5 and remain closed through station 8. As the molds pass between stations 6 and 7, their cavities are filled with molten metal. About 15° past station 7, the valve 102 is brought to neutral position by a cam 113A operating against lever 112. This permits free shrinkage of the casting and molds and equalization of pressures at opposite sides of the mold. It is important to the manufacture of good castings and prevents shrinkage, cracks, broken dies, etc., to a large degree. After passing station 8, the mold begins to open, as shown at station 9; and they are completely open at station 10, and remain open at stations 11 and 12 so that any castings which do not gravitate from the molds can be jarred loose.

At stations 1 and 2, the molds are partially enclosed by a hood 140 (Figs. 1 and 20) having an outlet 141 connected with a suction fan. The hood 140 is supported by an angle iron frame having vertical members 142 supported by the floor and horizontal members 143 attached to a bracket 144 attached to sleeve 90 which, as stated before, is supported upon rotating sleeve 87 (Fig. 7). By reason of the connection of sleeve 90 with the hood, the sleeve 90 is prevented from rotating. The hood is closed at the outer end by a plate 145 extending nearly to the floor and at the inner end by a shorter plate 146. The sides of the hood provide openings 147 through which the molds and mold frames can pass. Chain curtains 148 (Fig. 23) are suspended across these openings so as to retard the escape of particles of dust blown from the mold surfaces and particles of soot from the mold sooting flames.

Plates 145 and 146 support pairs of horizontal pipes 150 and 160. Pipes 150 are respectively connected with vertical pipe 151 closed at the lower end and having rows of small holes at 152 which direct the passage of compressed air toward the faces of the two molds 93 and 94 for the purpose of cleaning the molds. Pipes 150 are closed at their outer ends by caps 152 (Fig. 22) and their inner ends are connected by hoses 153 with a valve 154 shown diagrammatically in Fig. 24. By means to be described valve 154 is operated automatically to cause compressed air to flow from the perforated pipes 151 while they are being received between pairs of open molds. Since molds 93 and 94 may vary in thickness it may be necessary to adjust the pipes 151 so that the best coverage of the die faces will be obtained. For this purpose the pipes are slidable through collars 155 retained by clips 156 on a plate 157 through which the pipe passes. Plate 157 has vertical slots 157a receiving screws 157b received also by vertical slots 158a of plate 145. In this way plate 157 can be adjusted vertically and horizontally relative to plate 145 and, when secured in adjusted position nuts 157c (Fig. 22) threaded on the screws 157b are tightened. The pipe 150 can be moved horizontally relative to the collars 155 and secured in adjusted position by tightening screws 159 threaded through these collars.

The pipes 160 for conducting the gas, which is used when burning to soot the mold faces, are connected with vertical perforated pipes 161, represented by circles in Fig. 24. Pipes 160 are adjustably supported in the same manner as pipes 150 and are connected by suitable hoses with a gas valve 164 (Fig. 24), which is operated in a manner to be described to permit the flow of gas to pipes 160 during the time that the open molds receive between them the vertical pipes which extend from the pipes 160. The gas when thus admitted is caused to ignite by heat derived from a wire 170 (preferably nickel-alloy) which is caused to be heated by passage of electrical current. Wire 170 is protected by plate-like heat resistant deflectors shown diagrammatically at 170A from the sooting flame.

Referring to Fig. 24 which is a cam diagram, o is the center or axis of counterclockwise rotation of hub 35 and the radial lines marked Sta. 1, etc., represent stations past which the mold pairs are moved. Arc 112f represents the location of valve handles 112 required to condition valves 102 (Fig. 7) for forward or outward movement of the movable molds 93. Arc 112N represents the location of handles 112 in neutral position at which time no pressure is being applied to either open or close the molds, and arc 112f represents the location of handles 112 required to condition valves 102 for backward or inward movement of molds 93. Circles 112 represent handle positions in conformity with the status of the movable molds as shown in Fig. 1. Cam rods 113 and 113A and 113' which are located relative to fixed sleeve 90 (Fig. 7) control the positions of handles 112. During movement of the separated molds from station 12 through station 4, handles 112 are retained by a locking cam rod LC so that handles 112 cannot accidentally move from the position in which valves 102 are conditioned to maintain separation of the molds. This is a safety feature for the core setter and also assures that the molds are open during cleaning and sooting.

As shown in Fig. 7, fixed sleeve 90 supports cam SC for controlling switches CS1 and CS2 of Fig. 26, one of these being shown in Fig. 1. Each switch has a roller $r$ which a spring in the switch urges against switch cams SC. The movement of the rollers $r$ is actually vertical but, in Fig. 24, this movement appears as horizontal. When a roller $r$ is on the lower part of a cam SC, the associated switch is closed; and it is open when roller $r$ is on the high part of the cam SC. Switch CS1 is closed during the time when the open molds passing station 1 receive between them the air jet pipes 151. Switch CS2 is closed during the time when the open molds passing station 2 receive between them the gas jet pipes 161 supported vertically by pipes 160. The gas igniting hot wire 170 is located relative to pipes 161, as shown in Fig. 24. The cams SC are adjustable vertically and radially to control both period and time of operation of switches CS1 and CS2.

Referring to Fig. 26, wires 1, 2, 3 connected with an A. C. source are connected by manual switch SW1 with wires 1a, 2a, 3a which are connected by magnetic switch SW2 with wires 1b, 2b, 3b when its coil C2 is energized. Wires 1b, 2b, 3b are connected with motor 180 which operates the suction fan or blower which causes circulation of air to cool the molds. Wires 1b, 2b, 3b are connected by magnetic switch SW3, when its coil C3 is energized with motor 50 which operates the machine.

Wires 1d, 2d, 3d connected with wires 1a, 2a, 3a are connected by magnetic switch SW4, when its coil C4 is energized, with wires 1e, 2e, 3e. Wires 1e and 3e are connected with a starting transformer ST connected by wires 1f and 3f with wires 1b and 3b respectively. Wire 2e is connected directly with wire 2b. Intermediate terminals of transformer ST are connected with wires 4 and 5 which are connected when coil C4 is energized. Wires 1f, 2e, 3f carry the current for starting the motor 180.

Wires 2d, 3d are connected with primary $p1$ of a transformer T1 whose secondary is connected with wires 11, 12. Wire 11 is connected by push switch PB2 with wire 11a connected by air pressure switch PS with wire 11b. By closing push switch PB3 coil C3 of switch SW3 is energized through a circuit which includes in series wire 12, thermal switch TS4, wire 12a, thermal switch TS3, wire 12b normally closed push switch PB5, wire 12c normally closed push switch PB4, wire 12d, coil C3, wire 11c, switch PB3 when closed, wire 11b, switch PS when closed, wire 11a and normally closed switch PB2. C3 is energized to effect closing of switch SW3 to connect motor 50 with wires 1b, 2b, 3b, which carry current when switch SW2 is closed to supply current to motor 180. When switch SW3 is closed a by-pass is completed around switch PB3. Motor 50 will stop when either of switches PB2, PB4, PB5 are opened, or when either of switches TS3, TS4, heated respectively by heaters $h_3$, $h_4$ open due to motor overload, or in case of failure of the supply of compressed air for operating the air servo motors of the machine thereby causing switch PS to open.

When cam controlled switch CS1 closes, coil C7 of relay switch SW7 is energized by virtue of connection with wires 11a and 12 to cause switch SW7 to connect wires 11a and 12 with solenoid S7 of air control valve 154 to cause said valve to open to cause air to be admitted to pipes 150 for the purpose of blowing dust from the faces of the separated molds.

When cam controlled switch CS2 closes, coil C8 of relay switch SW8 is energized by virture of connection with wires 11a and 12 to cause switch SW8 to connect wires 11a and 12 with solenoid S8 of sooting gas control 154 to cause said valve to open to cause gas to be admitted to pipes 160 for the purposes of soot-coating the mold faces. The sooting gas is ignited by the hot wire coil 170 which receives current from the secondary $s2$ of transformer T2 whose primary $p1$ is connected by manual switch SW5 with wires 2b, 3b. The wires connecting coil 170 with secondary $s2$ passes through supporting rods 171 of non-conducting, heat-resisting material and provided with heat dissipating fins 172.

To start the motor 180, push switch PB1 is momentarily closed to cause coil C6 of relay switch SW6 to be connected as follows: wire 11, switch PB2, wire 11a, switch PB1, wire 13, coil C6, wire 14, thermal switch TS2, thermal switch TS1, wire 15, wire 12. Switch SW6 closes to connect wire 11a with wire 13, thereby by-passing switch PB1 which can be released, and to cause coil C4 of switch SW4 with secondary S1 of transformer T1 through the following circuit: wire 11, switch PB2, wire 11a, wire 13, normally closed contacts 16 of electric timer ET, wire 17, coil C4, wire 18, normally closed contacts 19 of switch SW2, wire 14, thermal switches TS2 and TS1, wire 15, wire 12. Switch SW4 closes its normally open contacts to complete connections with the starting transformer ST and opening its normally closed contacts thereby disconnecting wire 14 from wire 20 connected with coil C2 of switch SW2.

Motor 21 of timer ET is energized through the following circuit: wire 11, switch PB2, wire 11a, switch SW6, wire 13, motor 21, wire 18, contacts 19, wire 14, thermal switches TS2 and TS1, wire 15, wire 12.

Timer ET shown diagrammatically in Fig. 25 comprises the motor 21 which drives a speed reducer represented by gears 200, 201 which drives a shaft 202 which drives a magnetizable clutch member 203 having a thin brass face 204 against which magnetizable clutch disc 205 is drawn, when magnet coil 21m is energized. Disc 205 which is splinedly connected with a shaft 206, is normally urged by a spring 207 against shoulder 208 of shaft 206. Magnet coil 21m is enclosed by a fixed magnetizable shell 209. Shaft 206 is connected with a lever 210 which a spring 211 connected with lever 210 and a fixed support 211a urges against a pin 212 which is angularly adjustable about the axis of shaft 206. Lever 210 is adapted to engage a spring blade 213 connected with wire 13 and carrying contacts 16 and 22 engageable respectively with contacts. When the timer "times out" lever 210 has moved to engage lever and separate contacts 16, 16' and to engage contacts 22, 22'. When the motor 21 and the magnet coil 21m are open-circuited, the timer is reset meaning that the magnetic clutch is disengaged and spring 211 returns the lever 210 to the pin 212 and blade 213 separates contact 22 from contact 22' and engages contact 16 with contact 16'.

Timer ET "times out" after a certain time sufficient for the blower motor 180 to attain that speed at which it is proper to apply full voltage to motor 180. When contacts 16, 16' of timer ET separate coil C4 of switch SW4 is deenergized and switch SW4 returns to normal status. Then coil C2 of switch SW2 becomes energized through the following circuit: wire 11, switch PB2, wire 11a, switch SW6, wire 13, contacts 22 and 21', wire 23, coil C2, wire 20, normally closed contacts 24 of switch SW4, wire 14, thermal switches TS2 and TS1, wire 15, wire 12. Switch SW2 closes its normally open contacts to connect wires 1a, 2a, 3a with wires 1b, 2b, 3b so that full voltage is applied to motor 180 and to complete a bypass around contacts 22, 22' of timer ET and to open normally closed contacts 19 thereby de-energizing motor 21 and magnet coil 21m which causes the timer motor to stop and the timer to be automatically reset. When contacts 16, 16' reclose, coil C4 of switch SW4 is not re-energized because contacts 19 of switch SW2 are then open. Switches SW2 and SW4 may be mechanically interlocked so that the normally open contacts of one switch can not be closed while the normally open contacts of the other switch are closed. Motor 180 is stopped by opening switch PB2 or by the opening of either of overload switches TS1 or TS2 heated by elements $h_1$ and $h_2$ respectively.

The circuits for starting motor 180 and causing it to run on full voltage are not by itself a part of the present invention. However, when motor 180 is stopped by opening switch PB2, current no longer flows to motor 50 and to the gas igniting coil 170, and coil C3 is deenergized and switch SW3 opens and no current flows to valve solenoids S7 and S8 and valves 154 and 164 close to shut off blowing air and sooting gas, although switches CS1 and CS2 might be closed when the machine stops. The overloading of motor 180 causing one or both of the thermal overload switches TS1, TS2 to open will cause cessation of current flow to motor 50 and to gas igniter coil 170.

The system requires that motor 180 be started and brought nearly to full speed before motor 50 can operate. This insures that air will be circulating about the molds before the machine can be operated or the sooting gas ignited. The current passed by the transformer ST to wires 1f, 3f would not be sufficient to start motor 180 and also effect any operation of motor 50 if switch SW3 were closed and to effect any material heating of wire 170 if switch SW5 were closed during starting of motor 180. Therefore the procedure is to close switch PB1 momentarily and wait for motor 180 to operate at full speed before closing switch SW5 and closing switch PB3. The closing of switch PB3 will not cause motor 50 to start even after motor 180 is running at full speed, if the source of compressed air for operating the air-servos of the machine is not operating or has not been connected by opening a valve with the air manifold of the machine.

Switch PB5 represents a plurality of switches in series placed in various readily accessible positions for stopping the machine in emergency. For example, a switch PB5 is readily accessible to the operator who places the cores in one of the molds so that he may stop the machine in case there is difficulty in placing the cores properly in the time of travel of the molds past the core setters stations.

Secondary S2 of transformer T2 has a plurality of tops so that the voltage applied to coil 170 can be adjusted to suit the material of coil 170 or the temperature of the air surrounding the machine.

While the embodiment of the present invention as herein disclosed, constitutes a preferred form, it is to be understood that other forms might be adopted.

What is claimed is as follows:

1. A control system for a permanent molding machine having a plurality of molds operable sequentially from closed to open position, a cooling device for the molds and driving means for causing sequential operation of said molds, including a source of electric current, a starting circuit for the machine, a first switch operatively connected with said source and connected in said starting circuit for controlling the operation thereof, an energizing circuit for said coiling device, a second switch connected to said source and connected in said energizing circuit for the cooling device for controlling the operation thereof, an energizing circuit for the driving means, a third switch operatively connected to said source and connected in the energizing circuit for said driving means for effecting operation of the driving means to cause sequential operation of the molds, and a circuit operatively interconnecting said three switches constructed and arranged so that the first switch must be in the closed position before the second switch can be closed, and the second switch must be in the closed position before the third switch can be closed.

2. The combination with a permanent molding apparatus comprising a plurality of split molds sequentially operated from open to closed position, said molds being carried by a turntable whereby continuous operation of the apparatus is progressively maintained, means for opening and closing the molds, driving means for the turntable, and ventilating means for cooling said molds, of an interlocking electric system for said apparatus comprising a source of electric current, a starting circuit for said apparatus, a first switch operatively connected to said source and connected in said starting circuit for conditioning the apparatus for operation, an energizing circuit for the ventilating means, a second switch in the energizing circuit for the ventilating means and operatively connected to said source for controlling the operation thereof, an energizing circuit for said driving means, a third switch operatively connected to said source and connected in the energizing circuit for said driving means for controlling the operation thereof, and an electrical circuit operatively connected to said source and with each of said three switches for controlling the operation thereof, said last-named electrical circuit being constructed and arranged so that the second switch cannot be closed until the first switch is closed, and the third switch cannot be closed before the second switch is closed.

References Cited in the file of this patent

UNITED STATES PATENTS

| Number | Name | Date |
|---|---|---|
| 1,493,469 | Candler | May 13, 1924 |
| 1,725,984 | Jenson | Aug. 27, 1929 |
| 1,746,236 | Barton | Feb. 11, 1930 |
| 1,752,308 | Pettis | Apr. 1, 1930 |
| 1,856,352 | Morris et al. | May 3, 1932 |
| 1,913,945 | Morris et al. | June 13, 1933 |
| 1,925,496 | Nichols | Sept. 5, 1933 |
| 1,925,497 | Shippy | Sept. 5, 1933 |
| 2,348,173 | Young | May 2, 1944 |
| 2,459,892 | Palmer et al. | Jan. 25, 1949 |
| 2,474,963 | Wessel | July 5, 1949 |